(12) United States Patent
Huang

(10) Patent No.: US 6,490,103 B1
(45) Date of Patent: Dec. 3, 2002

(54) LENS ASSEMBLY FOR MONITOR WITH INFRARED AND FOCUS ADJUSTMENT

(76) Inventor: Chun-Ru Huang, P.O. Box 82-144, Taipei (TW)

( * ) Notice: Subject to any disclaimer, the term of this patent is extended or adjusted under 35 U.S.C. 154(b) by 0 days.

(21) Appl. No.: 09/897,022

(22) Filed: Jul. 3, 2001

(51) Int. Cl.$^7$ ................................................. G02B 7/02
(52) U.S. Cl. ....................................................... 359/819
(58) Field of Search .................................. 359/819, 821, 359/827, 828, 829; 396/526; 362/455; 353/100

(56) References Cited

U.S. PATENT DOCUMENTS 4,825,076 A * 4/1989 Shields ........................ 250/343
5,833,596 A * 11/1998 Bonnell et al. ............. 250/353
6,354,733 B2 * 3/2002 Glasheen et al. ........... 374/120

* cited by examiner

Primary Examiner—Ricky Mack
(74) Attorney, Agent, or Firm—Leong C. Lei

(57) ABSTRACT

A lens assembly for monitor with Infrared and focus adjustment is disclosed and the assembly comprises (a) a blocking rim, (b) a front cover, (c) an IR device, (d) a main lens, (e) a main lens mounting rim, (f) a tension spring, (g) an adjustment rim, (h) a mount-connection plate; and (i) an adjustment rim mounting plate; wherein the main lens can be replaced in part so that the monitor is provided with the replacement options of lens.

3 Claims, 6 Drawing Sheets

LENS ASSEMBLY FOR MONITOR WITH INFRARED AND FOCUS ADJUSTMENT

BACKGROUND OF THE INVENTION (a) Field of the Invention

The present invention relates to a lens assembly for monitor with infrared (IR) and focus adjustment.

(b) Description of the Prior Art

FIGS. 1 and 2 show a conventional monitor with lens assembly. The monitor A1 can be combined with an IR device for use at night. If it is needed, the IR device can be mounted to the monitor A1 to provide night photography. The disadvantages of this conventional monitor A1 are that (1) The IR device is a separate component and stands alone and therefore, it has to be bought and installed separately. This will increase the cost of installation.

(2) In view of the main lens used in the monitor A1 where different f-stop numbers are used, for instance, f/4.0, f/6.0, f/8.0. Thus, the IR device has to be appropriately selected in order to match with the main lens of the monitor A1. Otherwise, the quality of photograph is affected.

(3) In operating an IR device, the device has to adjusted and installed based on the similar orientation of the lens A2 of the monitor. The quality of the photography at night is similarly affected depending on the orientation adjustment. If the device is not appropriately adjusted to within a certain range. The night photography function of the IR device is lost.

FIG. 2 is a conventional lens device A2 of a monitor, comprising a lens seat A21, a rim seat A22 and a locking seat A23. The lens seat A21 includes main lens A211, and the main lens A211 is combined together with the lens seat A21 as an inseparable unit. The lens seat A21 has a screw body A212 mounted at the inner screw hole A221 of the rim seat A22 together with a spring A24 to enhance their mounting. The locking seat A23 and the rim seat A22 and screwed together so as to assist the entire lens device A2 to be mounted onto the monitor A1. The lens device A2 of the monitor has the function of focus adjustment, and the method of adjustment is by rotating the lens seat A21 to cause a displacement within the rim seat A22 (i.e., rim seat A22 is stationery). The mechanism of the displacement is totally restricted by the range of the spring force of the spring A24. Thus, the gap of focus adjustment is relatively small and the mechanism thereof is weak. Other than the problem of accommodation the main lens A211 of the conventional monitors cannot be partially replaced, for instance, to select f/4.0, f/6.0, f/8.0. Thus, the option of replacement of lens is restricted.

SUMMARY OF THE INVENTION

Accordingly, it is an object of the present invention to provide a lens assembly for monitor with infrared and focus adjustment, wherein the above-mentioned drawbacks are mitigated.

Yet another object of the present invention to provide a lens assembly for monitor with infrared and focus adjustment, wherein the main lens can be replaced in part so that the monitor is provided with the replacement options of lens.

An aspect of the present invention is to provide a lens assembly for monitor with infrared and focus adjustment comprising (a) a blocking rim, (b) a front cover, (c) an IR device, (d) a main lens, (e) a main lens mounting rim, (f) a tension spring, (g) an adjustment rim, (h) a mount-connection plate; and (i) an adjustment rim mounting plate; wherein the blocking rim is mounted at the internal screw threads of the inner edge of the adjustment rim, forming into a blocking edge of the external edge of the bottom of the front cover; the front cover is provided with a plurality of rim-like, conic shape through hole at the front face thereof, the center of the front cover is a slanting face and a throng hole with edged side is provided at the center section of the slanting face, the main lens is engaged within the through hole; the front cover is screwed to the adjustment rim by means of a screw seat within the front cover, and the symmetrical peg hole slot located on the screw seat face is inserted by a peg protrusion to secure with the mount-connection plate to form a tight engagement; the IR device has a rim-like structure as that of the circumferential face of the front cover and includes a plurality of rim-like IR emitters and a photosensor, the entire IR device is hidden within the front cover, and the plurality of IR emitter and the photosensor are mounted correspondingly into the conic hole, and a lead wire is inserted through the lead hole provided on the front cover and is then conductively connected with the IR device; the main lens is located at the through hole of the center of the slanting face of the front cover and the inner screw slot seat at the front cover center located at the main lens mounting rim mounts the main lens at the front edge thereof; the main lens mounting rim is screwed to the center inner screw slot seat of the front cover by the screw threads at the external edge thereof so as to engage the main lens; the tension spring is located at the space formed between the front cover and the middle slot of the mount-connection plate, and the tensional force allows a comparatively large width and tight screw mounting; the adjustment rim is screwed to the screw seat of the front cover by the middle slot screw seat of the interior thereof and the external edge of the middle slot screw seat is provided with a screw hole for the locking with the adjustment rim mounting plate so as to lock the adjustment rim mounting plate within the bottom slot; the mount-connection plate is located within the bottom external edge of the adjustment rim middle slot screw seat, and is screwed to the monitor by means of the screwed end thereof and the middle slot can hold the tension spring, and the peg protrusion is engaged at the peg hole slot of the front cover and is locked with the adjustment rim mounting plate of the adjustment rim at the top section thereof, forming a pivotally rotatable, relative structure; and the adjustment rim mounting plate is mounted within the bottom slot of the adjustment rim by a locking screw, and the adjustment rim is adjusted to form a pivotally rotatable, relative structure with the mount-connection plate.

Other objects, advantages and features of the present invention will become apparent from the following description taken together with the accompanying drawings.

DETAILED DESCRIPTION OF THE PRESENT INVENTION

Figure 1:
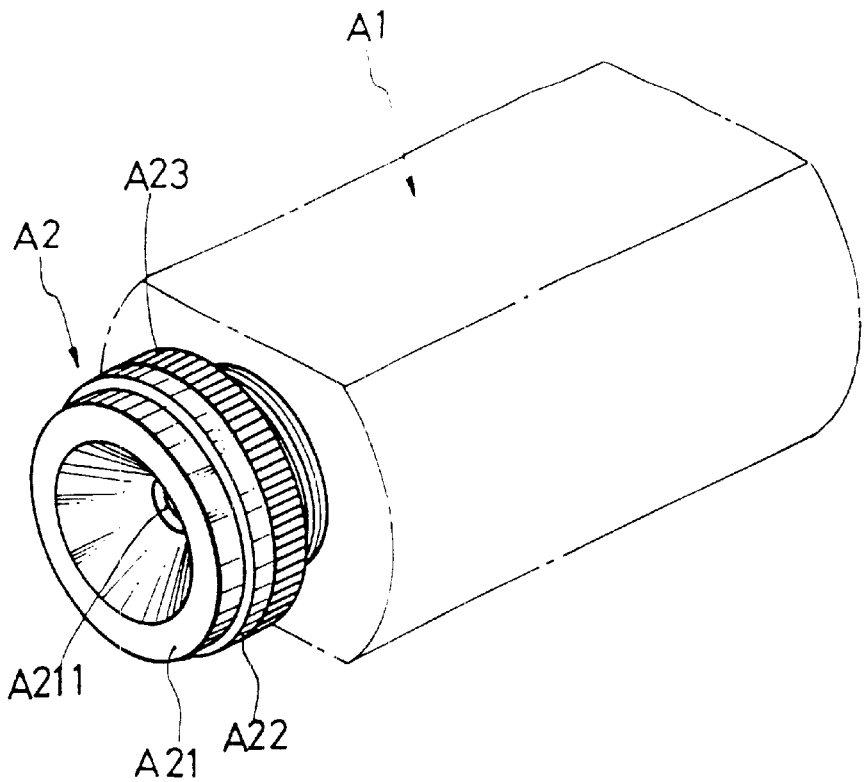
FIG. 1 is a perspective view of a conventional monitor and lens device.
Figure 2:
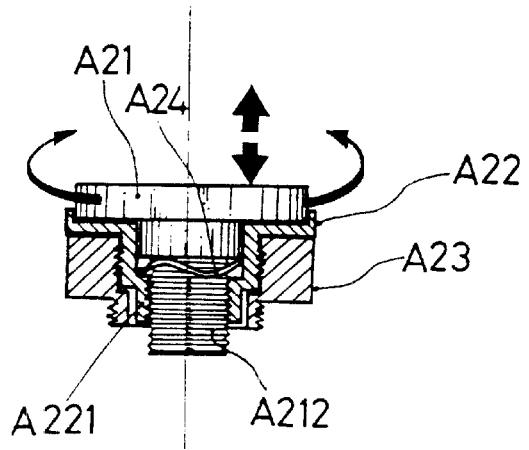
FIG. 2 is a sectional view of a conventional monitor and the lens device.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 3:
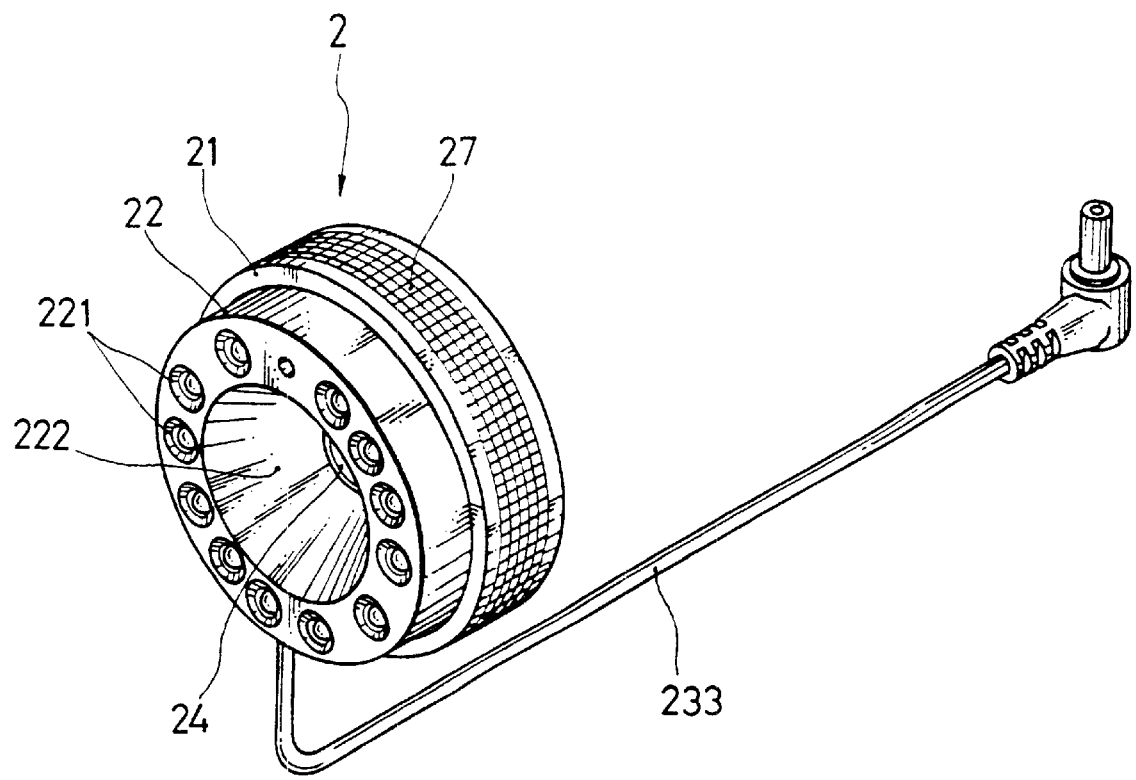
FIG. 3 is a perspective view of a preferred embodiment of the present invention.
Figure 4:
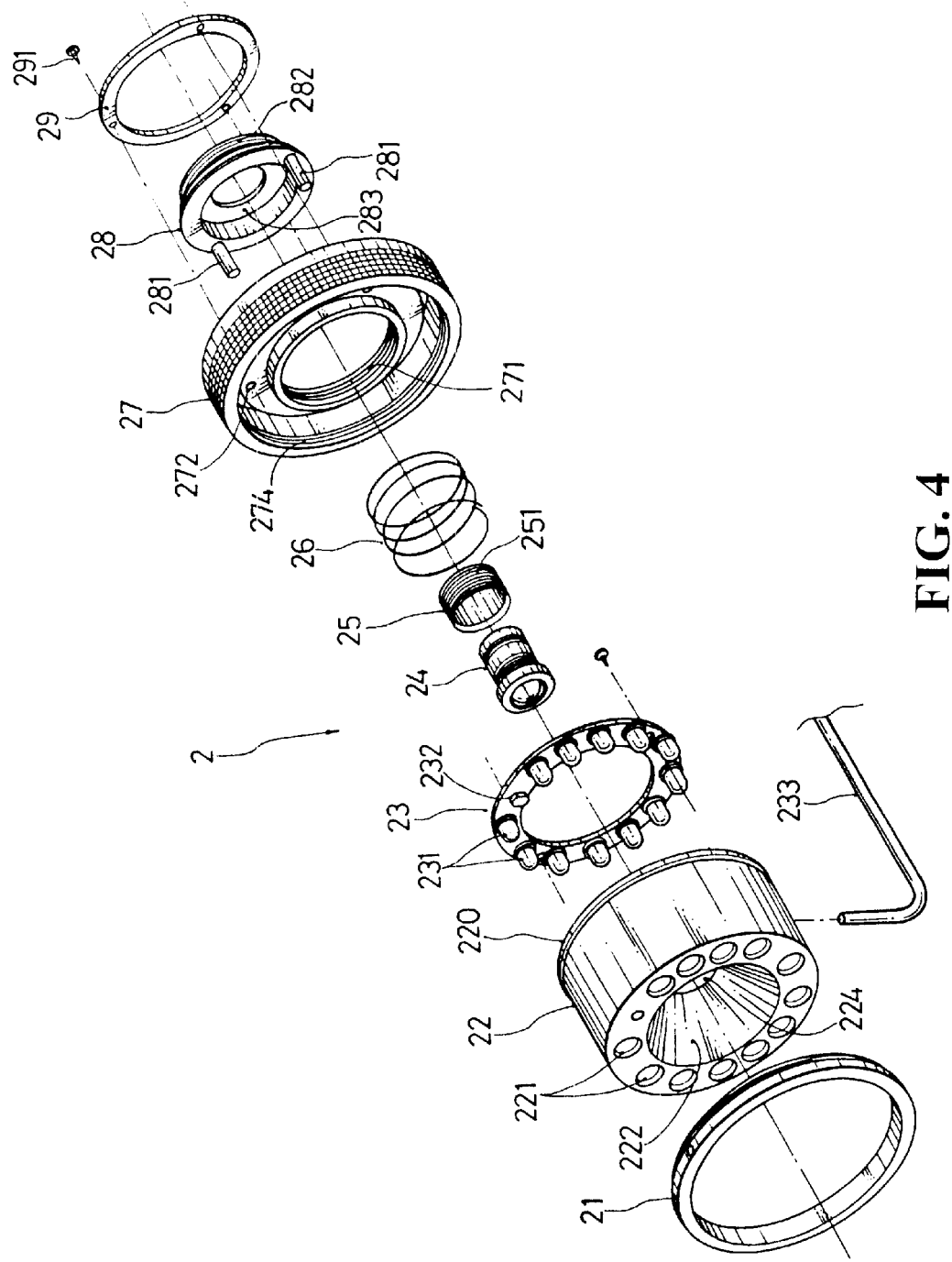
FIG. 4 is an exploded view of the lens assembly in accordance with the present invention.
Figure 5:
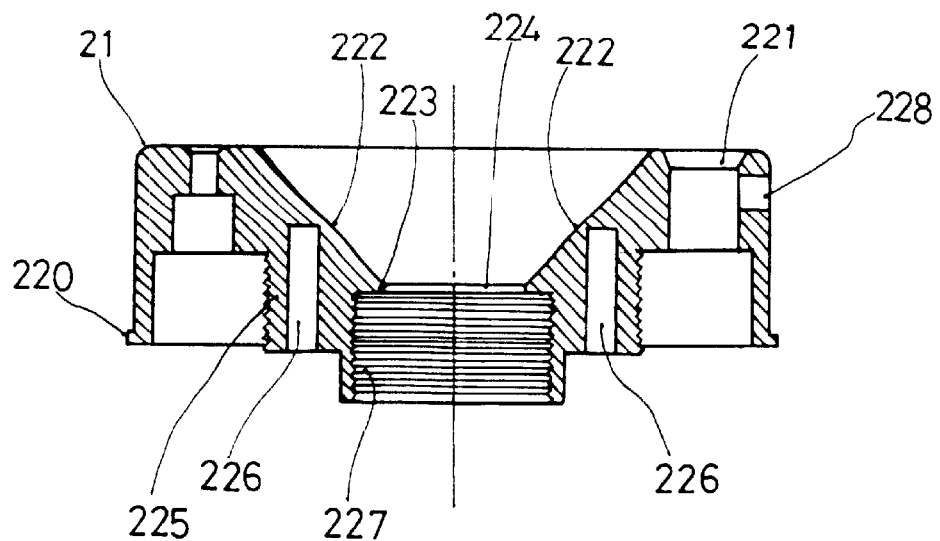
FIG. 5 is a sectional view of the front cover of the lens assembly of the present invention.

Referring to FIGS. 3 and 4, there is shown a monitor 1 utilizing a lens assembly 2. The lens assembly 2 comprises a blocking rim 21, a front cover 22, an IR device 23, a main lens 24, a main lens mounting rim 25, a tension spring 26, an adjustable rim 27, a mount-connection plate 28, and an adjustable rim mounting plate 29. Referring to FIG. 5, the front cover 22 is a mounting body having a bottom edge being provided with a blocking edge 220.

The circumferential face of the front cover 22 is provided with a plurality of rim-like through conic holes 221. The center of the front cover 22 is a slanting face 222 having the center being a through hole 224 with edge side 223 for the holding of the main lens 24. Further, the interior of the front cover 22 is provided with a screw seat 225 to mount together with the adjustable rim 27, and the screw seat 225 is provided with a corresponding peg slot 226 for the insertion of a peg protrusion 281 of the mount-connection plate 28.

Figure 7:
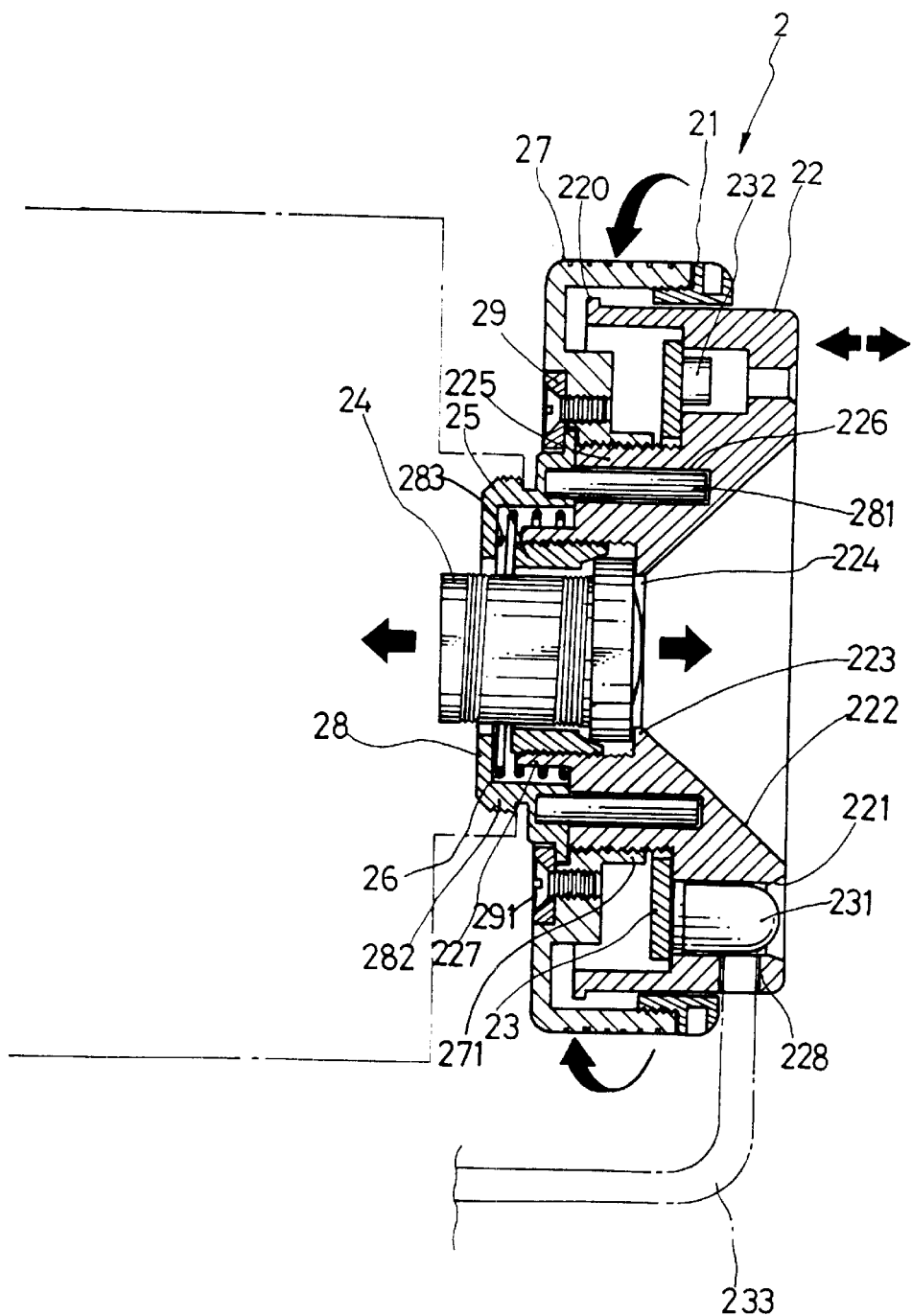
FIG. 7 is the sectional view of the entire structure of the lens assembly and its operation in accordance with the present invention.

Next, an inner slot seat 227 at the center of the front cover 22 is used for the locking of the outer edge of the main lens mounting rim 25 so as to secure the main lens 24 (referring to FIG. 7). In other words, the main lens 24 of the present invention can be replaced independently.

As shown in FIG. 4, the IR device 23 has a rim-like structure similar to the front circumferential face of the front cover 22, and the front face is provided with a plurality of IR emitters 231 and a photosensor 232. The photosensor 232 uses light as the sensing source to determine the initiation of the IR device 23. The IR device 23 is hidden within the front cover 22, and the IR emitters 231 and the photosensor 232 are located within the through conic hole 221, corresponding to each other, and a lead wire 233 passes through a lead hole 228 located on the circumferential edge of the front cover 22, for connection with the IR device 23, as shown in FIG. 7.

Figure 6:
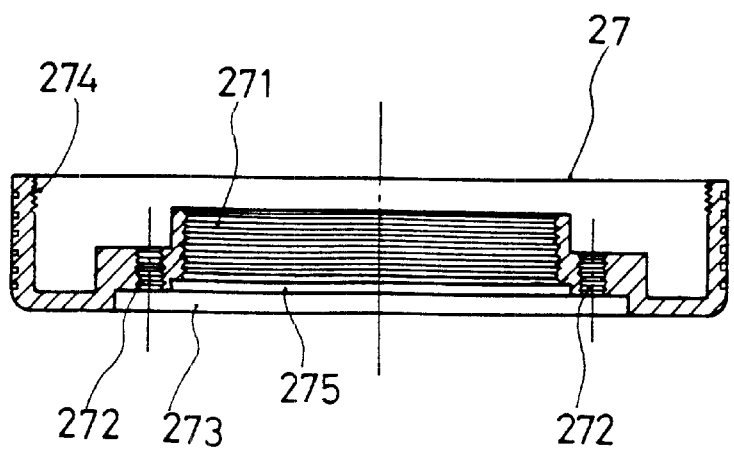
FIG. 6 is a sectional view of the adjustment rim of the lens assembly in accordance with the present invention.

Referring to FIGS. 4 and 6, the adjustable rim 27 has a similar rim-like body to mount with the front cover 22. The interior screw seat 271 thereof is arranged at the screw seat 225 of the front cover 22. By means of the tension spring 26, the two screw seats are joined together to provide an excellent mounting. Further, the external edge of the screw seat 271 is provided with a screw hole 272 for mounting the adjustable mounting plate 29 so that the mounting plate 29 is locked at the bottom slot 273 at the bottom section of the adjustable rim 27.

The blocking rim 21 is mounted to the inner screw threads 274 provided at the inner edge of the adjustable rim 27, forming into a blocking rim body structure. The blocking rim 21 blocks at the blocking edge 220 located at the external edge side so as to form engagement.

By means of the engagement, the adjustable rim 27 will not be dislocated. At the same time, it is the final position of the displacement of the front cover 22.

Referring to FIGS. 4 and 7, the mount-connection plate 28 and the adjustable rim mounting plate 29 are correspondingly mounted. As mentioned earlier, the adjustable rim mounting plate 29 is provided with a locking screw 291 to lock at the bottom face of the adjustable rim 27.

Figure 8:
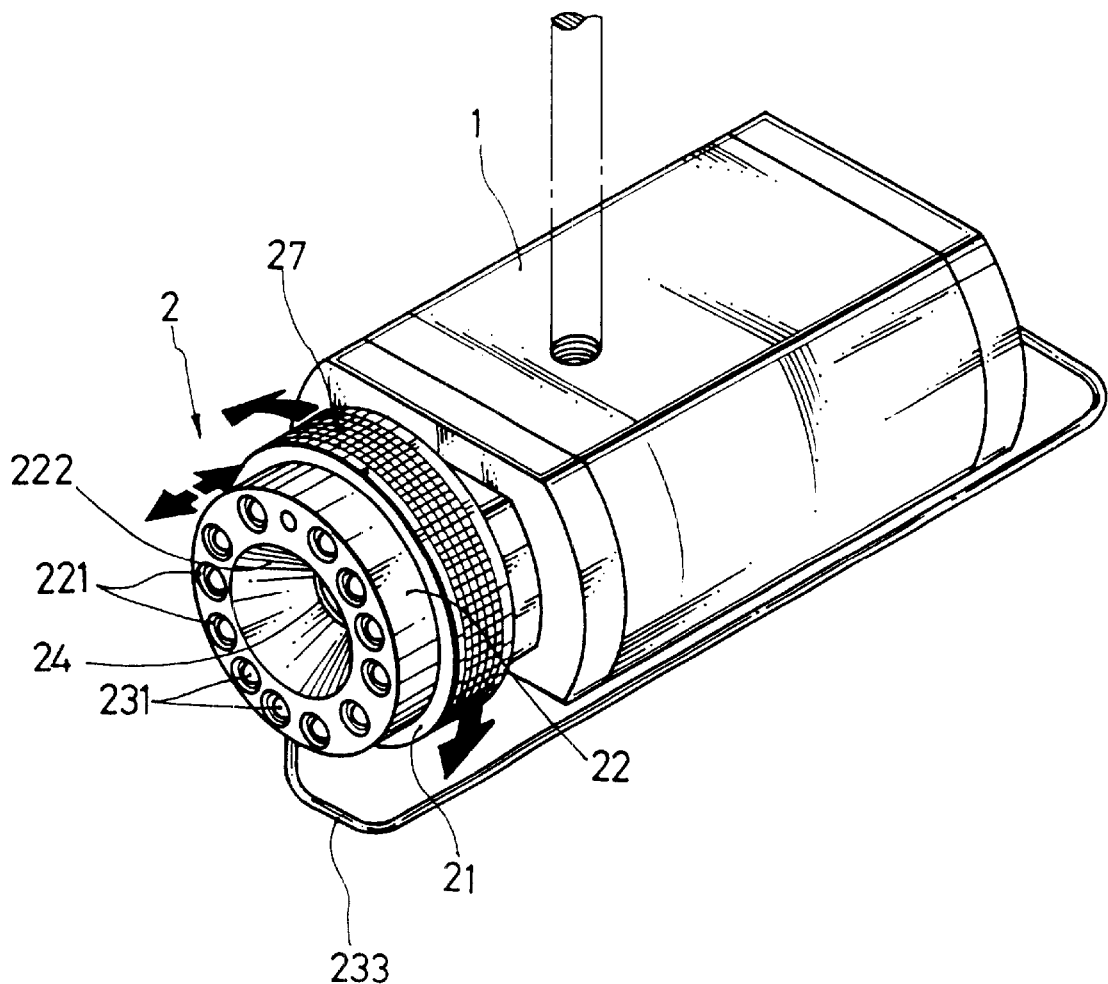
FIG. 8 is an operational view of the lens assembly in accordance with the present invention.

The mount-connection plate 28 is located at the external edge 275 of the screw seat 271, and is also locates at the bottom section of the mount-connection plate 28. The mounting plate 29 is locked at the adjustable rim 27 but it will not affect the engagement of the mount-connection plate 28. On the other hand, the mounting plate 29 is rotated and adjusted based on the adjustable rim 27 so that the mount-connection plate 28 and the mounting plate 29 are formed into a corresponding structure. In other words, the mount-connection plate 28 is fixed and the mounting plate 29 can be rotated based on the adjustment and the rotating of the adjustable rim 27. Next the symmetrical peg protrusion 281 extended from the mount-connection plate 28 is engaged at the peg hole slot 226 of the front cover 22, by means of the screw portion to mount with the monitor 1. The middle slot 283 within the monitor 1 is provided with a tension spring 26. In view of the above structure, the mount-connection plate 28 is screwed at the monitor 1 and the peg protrusion 281 is in engagement with the front cover 22. The adjustable mounting plate 29 is locked at the adjustable rim 27. Thus, the mount-connection plate 28, the front cover 22 and other components within the front cover 22 are not rotatable. Only the adjustable rim 27 can be rotated. By means of the rotating mechanism, the other components within the front cover 22 (including IR device, the main lens, the main lens mounting ring, the tension spring) move their focusing distance based on the gap of the screw distance of the front cover 22 and the adjustable rim 27 so that the rotating of the adjustable rim 27, focusing adjustment can be achieved without affecting the mechanism of the IR device 23, and the lead wire 233 does not need to be adjusted within the IR device 23, as shown in FIG. 8.

While the invention has been described with respect to preferred embodiment, it will be clear to those skilled in the art that modifications and improvements may be made to the invention without departing from the spirit and scope of the invention. Therefore, the invention is not to be limited by the specific illustrative embodiment, but only by the scope of the appended claims.

I claim:

1. A lens assembly for monitor with Infrared and focus adjustment comprising (a) a blocking rim, (b) a front cover, (c) an IR device, (d) a main lens, (e) a main lens mounting rim, (f) a tension spring, (g) an adjustable rim, (h) a mount-connection plate; and (i) an adjustable rim mounting plate; wherein (a) the blocking rim is mounted at the internal screw threads of the inner edge of the adjustable rim, forming into a blocking edge of the external edge of the bottom of the front cover;

(b) the front cover is provided with a plurality of rim-like, conic shape through hole at the front face thereof, the center of the front cover is a slanting face and a throng hole with edged side is provided at the center section of the slanting face, the main lens is engaged within the through hole; the front cover is screwed to the adjustable rim by means of a screw seat within the front cover, and the symmetrical peg hole slot located on the screw seat face is inserted by a peg protrusion to secure with the mount-connection plate to form a tight engagement;

(c) the IR device has a rim-like structure as that of the circumferential face of the front cover and includes a plurality of rim-like IR emitters and a photosensor, the entire IR device is hidden within the front cover, and the plurality of IR emitter and the photosensor are mounted correspondingly into the conic hole, and a lead wire is inserted through the lead hole provided on the front cover and is then conductively connected with the IR device;

(d) the main lens is located at the through hole of the center of the slanting face of the front cover and the inner screw slot seat at the front cover center located at the main lens mounting rim mounts the main lens at the front edge thereof;

(e) the main lens mounting rim is screwed to the center inner screw slot seat of the front cover by the screw threads at the external edge thereof so as to engage the main lens;

(f) the tension spring is located at the space formed between the front cover and the middle slot of the mount-connection plate, and the tensional force allows a comparatively large width and tight screw mounting;

(g) the adjustable rim is screwed to the screw seat of the front cover by the middle slot screw seat of the interior thereof and the external edge of the middle slot screw seat is provided with a screw hole for the locking with the adjustable rim mounting plate so as to lock the adjustable rim mounting plate within the bottom slot;

(h) the mount-connection plate is located within the bottom external edge of the adjustable rim middle slot screw seat, and is screwed to the monitor by means of the screwed end thereof and the middle slot can hold the tension spring, and the peg protrusion is engaged at the peg hole slot of the front cover and is locked with the adjustable rim mounting plate of the adjustable rim at the top section thereof, forming a pivotally rotatable, relative structure; and (i) the adjustable rim mounting plate is mounted within the bottom slot of the adjustable rim by a locking screw, and the adjustable rim is adjusted to form a pivotally rotatable, relative structure with the mount-connection plate.

2. The lens assembly of claim 1, wherein the photosensor is set to a weak/strong value of light source to determine the initiation of the IR device.

3. The lens assembly of claim 1, wherein the main lens is replaceable with respective to environment requires or needs.

* * * * *